Dec. 15, 1970   P. W. MARTINCIC ET AL   3,548,355
FOIL COILS WITH METALLIC BACK PLATES
Filed April 10, 1969   4 Sheets-Sheet 1

INVENTORS
Paul W. Martincic
and James R. Miller
BY
Donald R. Lackey
ATTORNEY

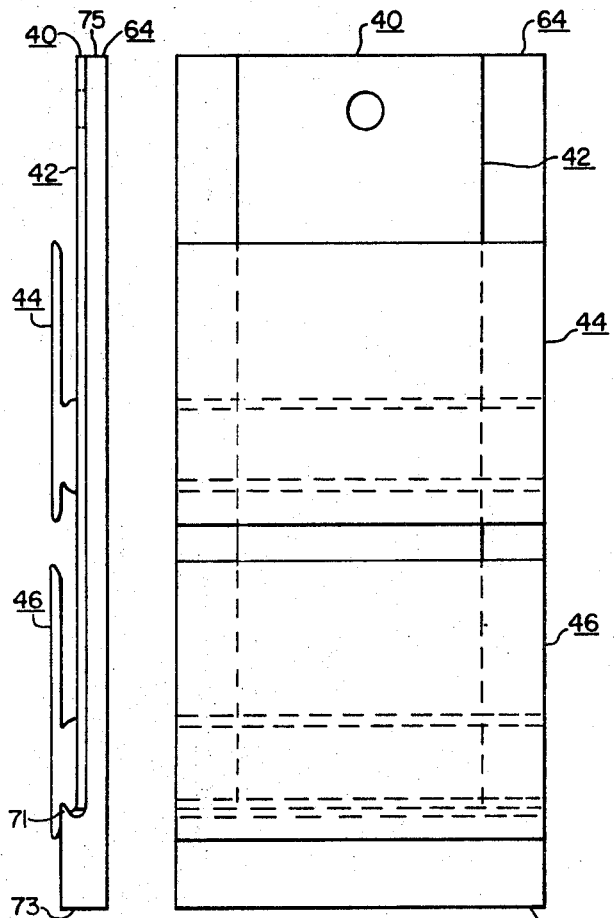
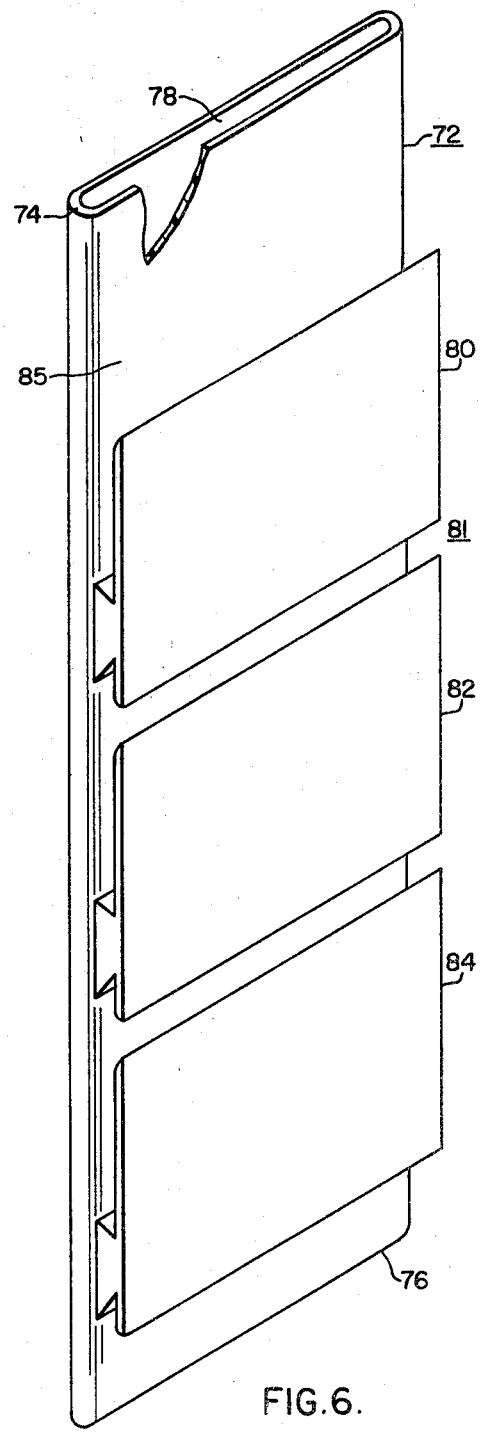
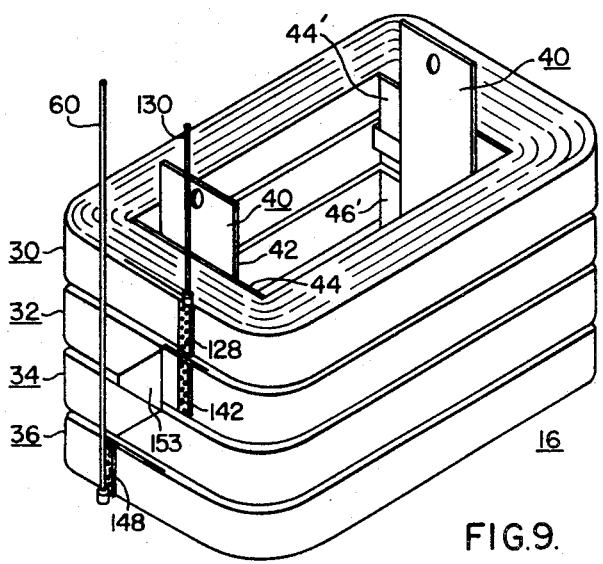
FIG. 5.   FIG. 4.   FIG. 6.   FIG. 9.

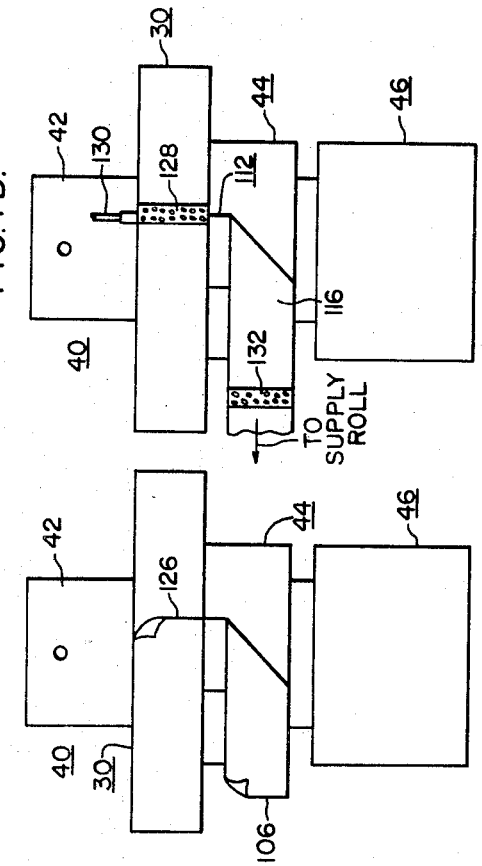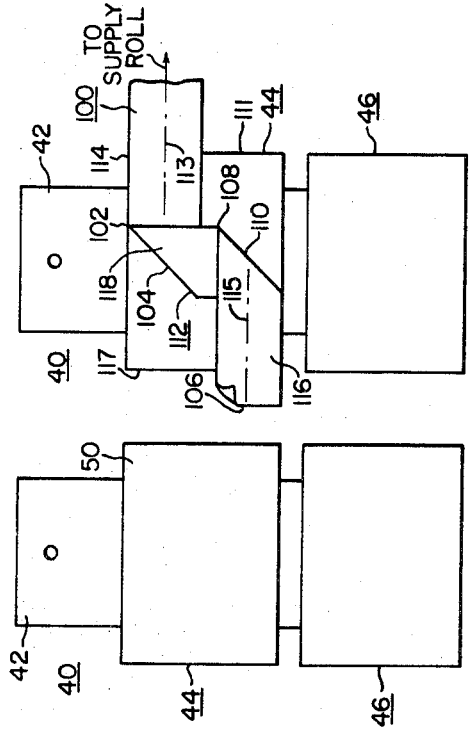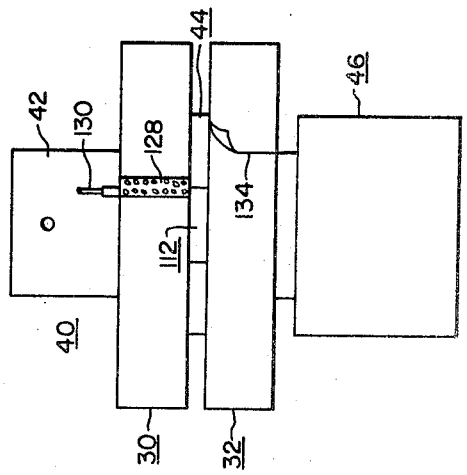

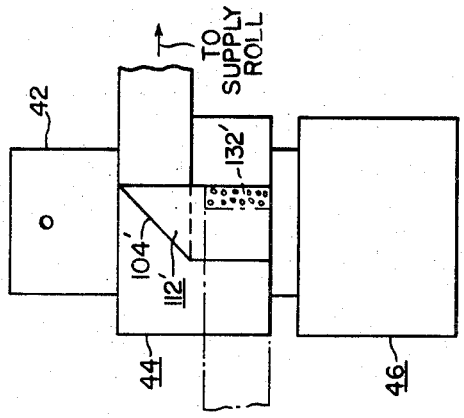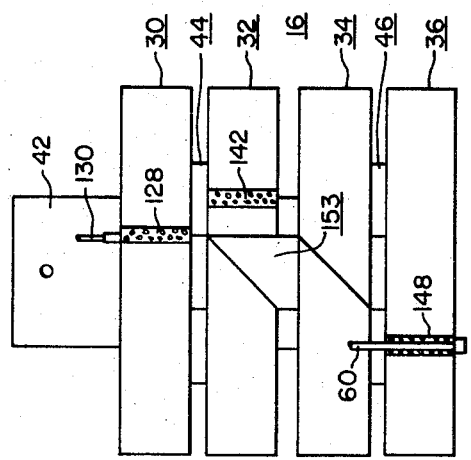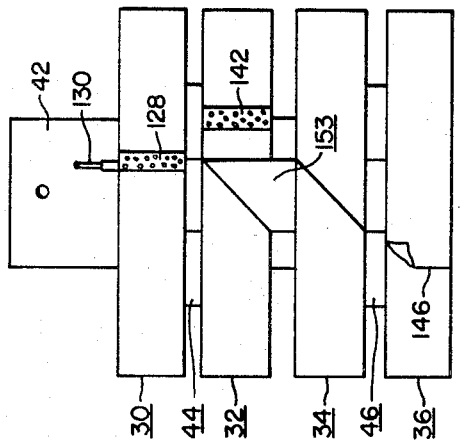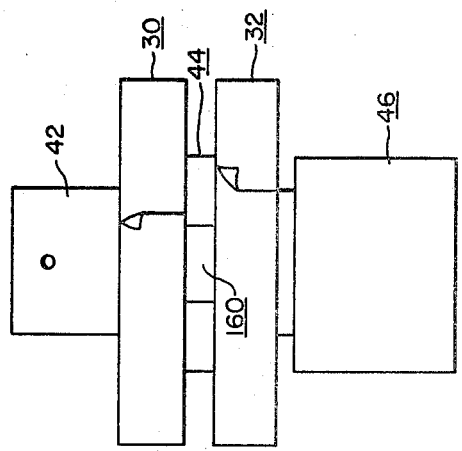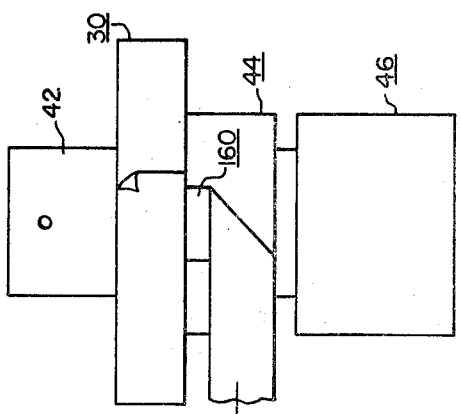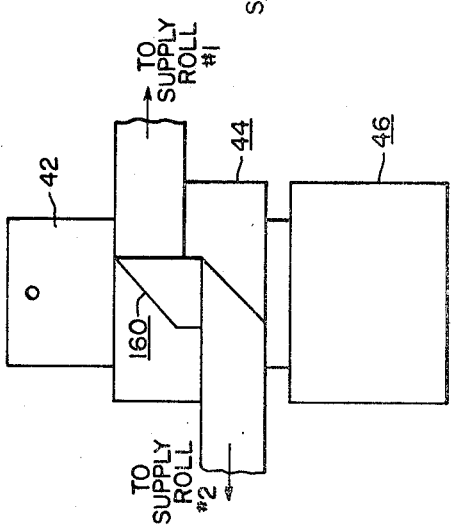

3,548,355
FOIL COILS WITH METALLIC BACK PLATES
Paul W. Martincic, Sharpsville, and James R. Miller, Sharon, Pa., assignors to Westinghouse Electric Corporation, Pittsburgh, Pa., a corporation of Pennsylvania
Filed Apr. 10, 1969, Ser. No. 815,035
Int. Cl. H01f 27/30
U.S. Cl. 336—60
31 Claims

ABSTRACT OF THE DISCLOSURE

Electrical inductive apparatus, and methods of constructing same, of the type having a plurality of electrical windings encapsulated in cast solid electrical insulation. At least one of the windings has a plurality of spaced electrically connected coil sections each formed of electrically conductive foil or strip, with the coil sections being fixed to metallic coil back plate members, which are supported on spaced insulating support members.

BACKGROUND OF THE INVENTION

Field of the invention

The invention relates in general to electrical inductive apparatus, such as transformers, and more specifically to electrical inductive apparatus of the encapsulated type, and new and improved methods of constructing winding assemblies therefor.

Description of the prior art

Castable solid electrical insulation systems, such as those of the epoxy type, provide superior insulation systems which may be used for encapsulating electrical windings, such as windings for electrical distribution transformers. Cast solid insulation has insulating qualities approximately 100 times better than air. Thus, the use of cast solid insulation systems to encapsulate transformer windings, allows the size of the transformers to be reduced, as the insulating clearances may be reduced. Solid insulation may fail by "puncture" through the body of the solid material, or by "creep" around the edges of the solid insulation. The resistance of most solid insulation systems to failure by puncture is far greater than their resistance to failure by creep, particularly if the creep path can be contaminated by moisture or conductive particles. Therefore, the electrical apparatus should be designed to stress the solid insulation primarily in puncture, with creep paths either being eliminated, or made sufficiently long.

Encapsulating windings with solid insulation, which are of the type having wire conductors, with many conductor turns per layer, creates problems due to the difficulty in uniformly impregnating the winding turns with viscous encapsulating material. Voids in the solid insulation about the winding turns, in addition to creating barriers to the flow of heat away from the windings, produce places for air to ionize under the high voltage stresses present, causing corona discharges with their accompanying radio interference and degradation of the insulation. Wire-type conductors also provide a poor space factor. Thus, in order to solve these problems, the electrical windings which are to be encapsulated are usually constructed of electrically conductive metallic foil or strip material. Metallic strip or foil provides an excellent space factor, and eliminates high layer-to-layer stress and special layer insulation. With strip or foil type windings, each coil is formed of a plurality of radially superposed turns, with the foil or strip usually having a thin layer of insulating enamel on one or both of its major sides, which provides the turn-to-turn insulation required for the relatively low turn-to-turn stresses. Since there is only one turn per layer, and the turn-to-turn stresses are low, air entrapment between the turns is not a serious problem.

Problems arise in transformer design when using foil or strip type conductor, which makes it desirable to construct at least the high voltage winding with a plurality of axially spaced, electrically connected coil sections. The high and low voltage windings of a selected transformer rating each require a certain amount of conductor material. The low voltage windings, having a higher magnitude of current flowing therein, may use fairly thick conductive strip material, such as 32 mil aluminum strip having a width of 6.5 inches. Since the insulating coating on the strip is only about ½ mil per side, the conductor to insulation ratio is high, resulting in good space factor. The high voltage winding, however, requires much less volume of conductive material. For example, if foil having the same width as the strip of which the low voltage coils are wound, is used for the high voltage coil, the foil thickness required may be a mil or less. It is undesirable, however, to utilize such thin foil because it is difficult to handle and wind. Further, the ½ mil coating of insulation on each side of the foil becomes a major portion of the total winding volume, resulting in a very poor space factor, and the large amount of insulation compared to active conductor volume impedes heat transfer from the winding turns.

Thus, economies in space and cost may be realized by constructing the high voltage winding with axially spaced electrically connected coil sections or "part coils." This practice decreases the width of the foil used for each part coil, and the sum of the widths of all of the part coils is less than the width of the low voltage coils, thus increasing the thickness of the foil required for each part coil to a more practical value. An example of such construction is disclosed in copending application Ser. No. 675,840, filed Oct. 17, 1967, which is assigned to the same assignee as the present application. This copending application discloses a high voltage winding having two spaced coil sections, which are insulatingly fixed to metallic cooling ducts, with the "starts" or inner ends of the inner turns of the coils being electrically connected to connect the two part coils in series, and provide substantially no difference in potential between the inner turns of the two coils.

In some instances, however, a better space factor may be obtained, and also a more favorable electrical impedance, by constructing the high voltage winding with more than two part coils. The construction disclosed in the hereinbefore mentioned copending application, while suitable for two part coils, does not lend itself to three or more part coils, as there would then be a substantial voltage difference between the inner or start turns of certain adjacent coils, which may cause failure of the winding assembly due to creep across the surface of the solid insulation disposed between the two coils which is in contact with the metallic duct.

Therefore, it would be desirable to be able to take advantage of the improved space factor and impedance obtainable by the use of three or more part coils, if these advantages may be obtained without encountering excessive corona and construction problems. Further, since the plurality of part coils must be electrically connected, it would be desirable to be able to wind and interconnect the coils with a new and improved method which will reduce the time for manufacturing the coils, and therefore their cost.

SUMMARY OF THE INVENTION

Briefly, the present invention includes new and improved electrical inductive apparatus of the encapsulated type, and methods of constructing same, wherein a plurality of electrical windings are disposed in concentric adjacent relation. At least one of the windings has a plurality of axially spaced, electrically connected coil sections, each having a plurality of radially superposed turns formed of electrically conductive strip or foil. The coil sections, or part coils, are connected with successive start-start, finish-finish connections. For example, the ends of the inner turns of the first two coils are electrically interconnected, which is called a start-start connection, and the ends of the outer turns of the second and third coils are electrically interconnected, which is called a finish-finish connection. This sequence is repeated across the axially spaced coils, until all of the coils are serially connected.

The plurality of part coils are held in assembled relation by metallic coil back plates, and the metallic coil back plates are fixed to two spaced insulating support members. Electrical coils which are connected by start-start interconnections may be fixed to a common metallic coil back plate on each insulating support member, while the coils which are interconnected by finish-finish connections are fixed to different spaced metallic coil back plates. The metallic coil back plates have a cross sectional configuration which allows the coils fixed to adjacent metallic back plates, interconnected with the finish-finish connections, to be closely axially spaced, while still providing a long creep path between them.

BRIEF DESCRIPTION OF THE DRAWINGS

Further advantages and uses of the invention will become more apparent when considered in view of the following detailed description and drawings, in which:

FIG. 4 is an elevational view of the coil support structure shown in FIG. 2, modified to include a removable duct former;

FIG. 5 is a side elevational view of the coil support structure and removable duct former shown in FIG. 4;

FIG. 6 is a perspective view of a coil support structure constructed according to another embodiment of the invention, which includes a permanent duct former incorporated as part of the support assembly;

FIGS. 7A through 7I illustrate steps in a method of constructing a winding according to the teachings of the invention, which has a plurality of axially spaced start-start, finish-finish connected part coils;

FIGS. 8A through 8C illustrate alternate steps which may be used in constructing a winding according to the teachings of the invention, which has a plurality of axially spaced electrically connected part coils;

FIG. 9 is a perspective view of the winding shown in FIG. 7I, and

FIG. 10 illustrates another method which may be used to form intercoil connections.

DESCRIPTION OF PREFERRED EMBODIMENTS

Figure 1:
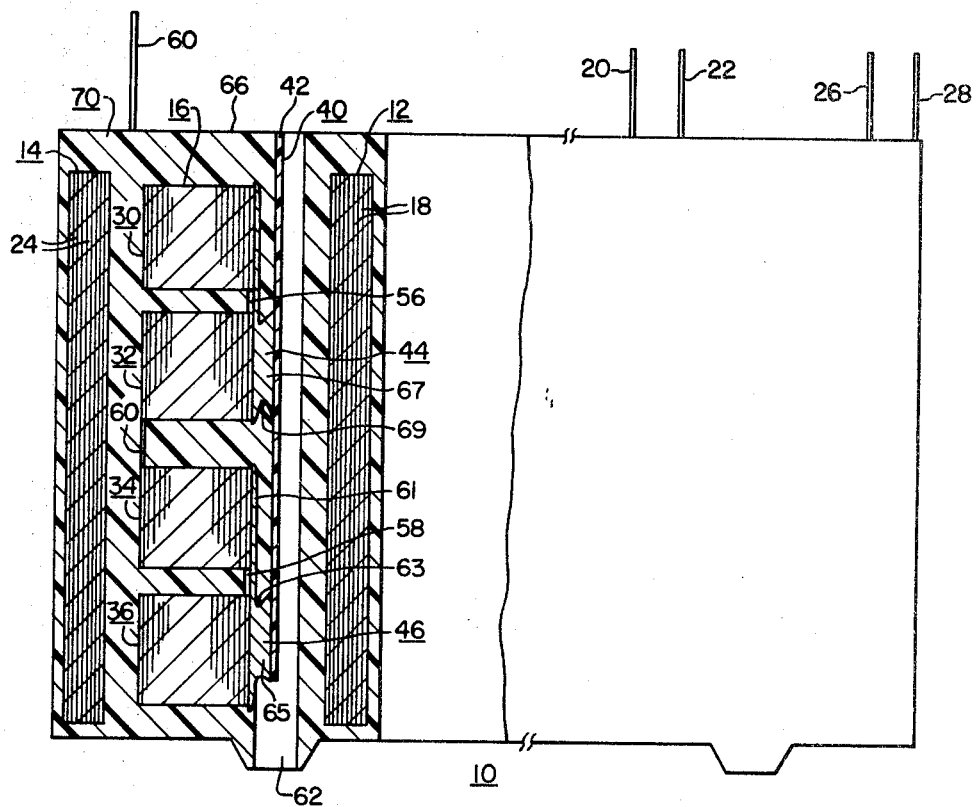
FIG. 1 is an elevational view, partially in section, of encapsulated electrical inductive apparatus constructed according to the teachings of the invention.

Referring now to the drawings, and FIG. 1 in particular, there is shown an elevational view, partially in section, of a transformer 10 constructed according to the teachings of the invention. Transformer 10, in this instance, includes inner and outer low voltage coils 12 and 14, respectively, and a high voltage winding assembly 16. The inner and outer low voltage windings 12 and 14 and high voltage winding assembly 16, are all disposed in concentric, adjacent relation about a common center line, with the high voltage winding assembly 16 encircling the inner low voltage winding 12, and with the outer low voltage winding assembly 14 encircling the high voltage winding assembly 16. The inner low voltage winding assembly 12, may be constructed of a plurality of radially superposed turns 18 of conductive strip material, such as copper or aluminum, which has a coating of electrical insulating material on at least one of its major sides, or which has a separate sheet of insulating material, such as a polyester film, bifilarly wound with the conductive strip material at the time the coil 12 is wound. The inner low voltage coil 12 has electrical leads or terminals 20 and 22 connected to its inner and outer ends, respectively.

In like manner, the outer low voltage coil 14 may be constructed of a plurality of radially superposed conductor turns 24, formed of a sheet or strip of electrically conductive material, with the inner and outer ends of coil 14 being connected to terminals 26 and 28, respectively.

The high voltage winding assembly 16 has a special construction, wherein the winding, in this instance, has four axially spaced coil sections or part coils 30, 32, 34 and 36. The part coils are supported on a special support structure or assembly, disposed at predetermined opposite ends of transformer 10, such as the support assembly 40 shown in FIG. 1. Since the support assembly at each predetermined end of transformer 10 is similar in construction, and since a cross-sectional view of transformer 10 on each side of the opening for receiving a magnetic core would be similar, transformer 10 is sectioned only at one end thereof. When describing the construction of the support assembly 40 shown in FIG. 1, FIGS. 2 and 3 will also be referred to, which illustrate front and side elevational views, respectively, of support assembly 40.

In general, support assembly 40 includes an upstanding insulating plate or support member 42, which may be made of any suitable insulating material, such as a glass polyester, and a plurality of metallic coil back plate members 44 and 46, with the number of metallic coil back plate members used depending upon the number of part coils utilized in the transformer.

The insulating plate member 42 has an opening 48 disposed near the top thereof, which, along with a similar opening in the other support assembly, provides means for receiving a shaft which facilitates handling of the completed assembly, as well as means for supporting and locating the winding assembly in a mold.

The metallic coil back plate members have a unique cross-sectional configuration which enables a plurality of coil sections to be closely axially spaced, taking advantage of the excellent strength of solid insulation, in puncture, in which the coils will be subsequently encapsulated, while still providing generous creep distances.

Figures 2, 3:
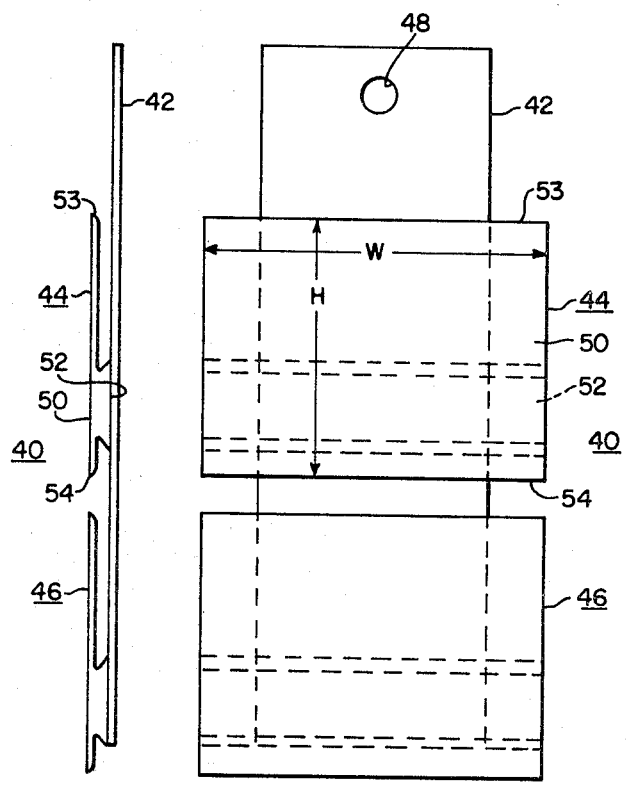
FIG. 2 is an elevational view of a coil support structure for use with windings which have a plurality of part coils, constructed according to the teachings of the invention.
FIG. 3 is a side elevational view of the coil support structure shown in FIG. 2.

More specifically, as shown most clearly in FIG. 3, each of the metallic coil back plate members, such as coil back plate member 44, has first and second parallel opposed sides 50 and 52, in which the area of the first major side 50 is much larger than the area of the second major side 52. The second surface or side 52 provides the base for the coil back plate, which is secured to the insulating support member 42, such as by a pressure sensitive thermosetting adhesive, and the first surface or side 50 provides a surface which cooperates with a surface on a similarly disposed coil back plate member on the other support assembly, to hold one or two of the part coils. The second surface 52 may extend across the complete width W of the back plate, but it extends only partially across the height dimension H thereof, preferably starting near the lower edge 54 as shown, and extending about midway across the height dimension. In other words, the coil back plate members are relatively thin adjacent most of the first surface 50, and they may be thought of as being formed of a thin plate-like member of which the first major surface 50 forms one side thereof, and having a trapezoidal shaped bar-like member attached to the other side thereof, with the large base of the trapezoid forming the second surface 52.

The coil back plate members may be conveniently constructed by extruding a member, such as of aluminum, which has a cross-sectional configuration as illustrated in FIG. 3 and then cutting the extruded member at predetermined measured locations along its length, to provide the desired number of back plate members. In manufacturing the high voltage winding assembly 16, a support assembly, such as support assembly 40 shown in FIG. 1, is disposed at each end of a winding mandrel, such as in the manner disclosed in copending application Ser. No. 663,766, filed Aug. 28, 1967, now Pat. No. 3,454,237, which is assigned to the same assignee as the present application, with the part coils being wound on the first surfaces 50 of the coil back plate members. One coil back plate member may be provided for each of the part coils, or as illustrated in FIG. 1, alternate pairs of part coils may be connected with start-start connections, which enables these pairs of coils to be disposed on a common coil back plate at each predetermined end of the transformer 10. Thus, an external terminal would be connected to the outer turn of the first coil section 30, and the circuit would then spiral inwardly in a predetermined circumferential direction until reaching the inner turn, the end of which is connected via conductor 56 to the end of the inner turn of the next adjacent coil section 32. Thus, there will be no potential difference between the inner turns of part coils 30 and 32 and they may be conveniently disposed on the same coil back plate member 44. A thin sheet of electrical insulation may be disposed, such as by a suitable adhesive, on the first surface 50, which, in addition to the enamel disposed on the electrically conductive strip material, will insulate the coils from the metallic back plate members. The coils may be held in position on the first major surface 50 by a pressure sensitive thermosetting adhesive. Since the electrical circuit will spiral outwardly in part coil 32, instead of inwardly, it should be wound in a circumferential direction opposite to that of which part coil 30 was wound, in order to provide a magnetomotive force which will be added to that provided by a part coil 30. The part coils 34 and 36 may be constructed in a manner similar to part coils 30 and 32, having their inner turns electrically interconnected by a conductor 58, with these part coils being disposed on coil back plate member 46. The ends of the outer turns of part coils 32 and 34 are electrically interconnected by a conductor 60, which completes the series connection of the plurality of part coils. The end of the outer turn of part coil 36 is connected to an external electrical terminal 60, thus providing a complete series circuit between the end of the outer turn of part coil 30 and the end of the outer turn of part coil 36, with the electrical circuit from one terminal to the other traversing each of the part coils in the same circumferential direction.

The coil back plate members 44 and 46 are oriented in a similar manner and fixed to the insulating support member 42 in spaced relation, such that part coils 32 and 34 are disposed in relatively close spaced relation. The inner turns of part coils 32 and 34 are at different electrical potentials, but they may be spaced fairly close together due to the excellent insulating qualities of cast solid insulation material in puncture. It should be noted, however, that even though the coils are closely spaced, that due to the cross-sectional configuration of the coil back plate members, that there is a very long creep path between the inner turns of part coils 32 and 34. In order for the voltage to flashover between the inside turns of part coils 32 and 34 over the surface of the cast solid insulation, a path would have to be established which includes the inner surface 61 of the thin portion of the back plate member 46, which is adjacent the outer surface 50, it would have to proceed all the way to the junction 63 of the trapezoidal portion 65 of back plate member 46 with the thin section, and then proceed along the interface between the solid insulation and the insulating plate member 42 until reaching the trapezoidal portion 67 of back plate member 44, and then proceed along the side of the trapezoid to the junction 69 between the thin section and the trapezoidal section of the back plate member, until reaching the inner turn of coil 32.

In addition to supporting the part coils during manufacturing and assembly thereof, the support structure 40, with its metallic coil back plates, also has the function of providing corona shielding means for the high-low space between the high voltage winding 16 and the inner low voltage winding 18, and any cooling ducts which may be disposed through that high-low space, such as cooling duct 62. If the support assembly 40, including the insulating plate member 42 and the coil back plate members 44 and 46 were to be constructed of an insulating material, in the shape or configuration illustrated in FIG. 1, it would still be necessary to provide a conductive surface at the location of surface 50, in order to provide this corona shield.

Certain transformer constructions require cooling ducts, while others do not. In those instances where a cooling duct is not required, it is only necessary to dispose the high and low voltage coil assemblies in adjacent concentric relation, within a suitable mold, and introduce the cast insulation system, which is gelled and cured to a solid, such as the solid insulation 70 shown in FIG. 1. In those instances where a cooling duct or ducts are required through the solid insulating material 70, they may be provided by disposing the supporting structures 40 on a tapered removable metallic duct forming member, such as the duct former 64 shown in FIGS. 4 and 5. FIGS. 4 and 5 are front and side elevational views, respectively, of the support structure 40 shown in FIGS. 2 and 3, modified to include the removable duct former 64. The removable duct former 64 has a suitable mold release material disposed thereon, such as polytetrafluoroethylene, and is driven out of the cast transformer assembly after the winding assemblies have been encapsulated with a solid insulation system. Thus, as illustrated in FIGS. 4 and 5, the lower coil back plate member 46 may have its trapezoidal portion 65 resting on a step 71 formed on the lower end of duct former 64. The lower end 73 of duct former 64 will rest on the mold, and its upper end 75 will extend above the upper surface 66 of the cast solid insulation 70. Thus, after the windings are encapsulated, and the solid insulation is gelled and cured, the tapered duct former 64 may be driven from its assembled location by force applied to end 75, which provides a duct 62 through the solid insulation 70. The upper end of the insulating plate member 42 will also extend above the upper surface 66 of the solid insulation 70, and is cut flush with surface 66, after the solid insulation 70 is cured, as illustrated in FIG. 1.

The solid insulation 70 which is used to encapsulate the electrical windings of the transformer 10 may be of any suitable formulation which will be highly resistant to cracks, which has a high mechanical strength, both at the low and elevated temperatures to which the transformer 10 may be subjected, and which is impervious to attack from insulating fluids which may be used to cool the transformer. Examples of suitable encapsulating materials which may be used are disclosed in copending applications Ser. Nos. 645,320, now Pat. No. 3,434,087, 707,875, now Pat. No. 3,493,531 and 749,846, filed June 12, 1967, Feb. 23, 1968, and Aug. 2, 1968, respectively, which are assigned to the same assignee as the present application. In general, encapsulating resins of the epoxy type, having a filler selected to enable the cast resin system to closely match the coefficient of thermal expansion of the windings embedded therein, have been found to be very successful.

As hereinbefore stated, certain applications for distribution transformers require that ducts be disposed through the solid insulation for facilitating the removal of heat from the transformer windings. While the method of using a removable duct former has been found to be satisfactory for transformers in which the duct length is in the order of eight to ten inches, the removal of a duct former when the duct length exceeds these dimensions becomes extremely difficult. Therefore, instead of utilizing a removable duct former, in certain applications it may be desirable to utilize a preformed insulating duct former, to which the metallic coil back plate members may be secured. A coil support arrangement 81 having an integral, permanent duct forming member, constructed according to another embodiment of the invention, is illustrated in FIG. 6. FIG. 6 is a perspective view which illustrates a continuous duct forming member 72 which may be formed of a glass polyester, or other suitable insulating material. Duct forming member 72 has first and second major outer sides, such as side 85, first and second ends 74 and 76, respectively, and an opening 78 which extends between its ends. The dimension of duct former 72 between its first and second ends 74 and 76 is selected such that the duct forming member 72 will extend slightly above the upper surface of the solid insulation after it has been cured. A plurality of metallic coil backup plates 80, 82 and 84 may be disposed in spaced relation across one of the major sides, such as side 85, of the duct former 72, and secured thereto, such as with a pressure sensitive, thermosetting adhesive. The configuration and design of these metallic coil back plate members may be the same as hereinbefore described relative to the embodiment of the invention shown in FIGS. 1, 2 and 3.

Before the encapsulation of the windings, the openings at the ends 74 and 76 of the duct forming member 72 are sealed with a high temperature tape, the high voltage part coils are wound on the major outer surfaces of metallic coil back plates, after fixing a suitable sheet of insulation to these surfaces, and a thermosetting adhesive is disposed between the duct former 72 and the coil back plates 80, 82 and 84 which is cured when the part coils are heated while still on the winding mandrel, to consolidate their turns. The consolidation of the turns of a coil formed of electrically conductive sheet or strip material, is disclosed in copending application Ser. No. 669,549, filed Sept. 21, 1967, which application is assigned to the same assignee as the present application. After the electrical coils of the transformer are encapsulated with solid insulation and the solid insulation is gelled, the portion of the duct former 72 which extends above the upper surface of the cast portion of the transformer may be cut flush therewith, and the tape removed from the bottom end 76 of the duct former 72.

The construction of the high voltage winding 16 shown in FIG. 1, wherein two coils are fixed to a common coil back plate member, requires that the coils be interconnected with successive start-start, finish-finish connections. In other words, the first pair of coils have the ends of their inner turns electrically interconnected, and the next pair of coils have the ends of their outer turns electrically interconnected. Thus, alternate pairs of coils are electrically interconnected with start-start connections, and the remaining pairs of coils are electrically interconnected with finish-finish connections. It should be noted that the start of a coil is the end of its inner turn, regardless of where the electrical circuit first enters the coil.

The electrical interconnection between the part coils of the high voltage winding assembly 16 are difficult to make, using conventional techniques. FIGS. 7A through 7I illustrate the steps in manufacturing a high voltage winding, such as high voltage winding assembly 16, in which the making of the interconnections between the part coils is greatly facilitated, reducing the time and therefore the cost involved in the manufacture of such part coil windings. Specifically, FIG. 7A is an elevational view of the support assembly 40 shown in FIG. 1, with a similar support assembly being disposed in spaced relation directly in back of it. As hereinbefore stated, the support assemblies are connected to opposite ends of a winding mandrel. The major surfaces 50 of the metallic coil back plate members 44 and 46 are covered with a thin sheet of electrical insulation, which may be fixed thereto with a pressure sensitive, thermosetting adhesive, and the outer surface of the thin sheet of insulation may also have a thin coating of pressure sensitive, thermosetting adhesive disposed thereon.

The next step in the construction of winding 16 is to form a start-stop connection 112 between the first two coils 30 and 32. This may be accomplished by providing a preformed "Z" shaped piece, but this requires two crimp type connectors. It would be preferable to eliminate one or both of these connectors. One of the connectors may be eliminated, as illustrated in FIG. 7B, by folding the foil or strip material of which the coils are to be wound at first and second spaced points near the end of the roll of foil material, and disposing the resulting interconnection 112 against the pressure sensitive adhesive on back plate member 44. The foil 100, from which the first part coil 30 is to be wound, is folded at a first point 102, perpendicular to the sides or edges of the foil 100, which provides a diagonal fold 104, and the foil 100 is folded at a point between fold 104 and the end 106 of the foil, such as at point 108, with the fold again being made perpendicular to the sides of the foil, which provides a diagonal fold 110. As illustrated in FIG. 7B, the two spaced folds 104 and 110 should be made in a direction which will continue the original direction of the foil. In other words, the start-start interconnection, shown generally at 112 has a substantially Z configuration, or a backward Z configuration, with the folds 104 and 110 being parallel with another. The foil 100 enters one side of the back plate member, such as side 111, it is then offset from its original axial location, indicated by broken line 113, into a second axial location indicated by broken line 115, and it then proceeds away from the coil back plate member 44 on the opposite side 117 thereof. The start-start interconnection 112 thus has two parallel portions 114 and 116 and a perpendicular interconnecting portion 118. The supply roll of electrically conductive foil is integrally connected to portion 114, eliminating a connector between the interconnection 112 and the first part coil. As illustrated in FIG. 7C, the first part coil or coil section 30 may then be wound from the supply roll with the edges of the radially superposed turns of coil section 30 being aligned with the edges of the first section 114 of the start-start connection 112. After the requisite number of conductor turns has been obtained for part coil 30, the foil is severed to provide an end 126, to which a terminal 128 may be connected, as illustrated in FIG. 7D. Terminal 128 may be a crimp type terminal which has a plurality of sharp tangs which bite into the foil 100 and penetrate any coating of enamel or electrical insulation disposed on the foil, when the terminal is crimped on the foil. A wire 130 may be fixed to terminal 128 which will extend outwardly from the transformer and provide a terminal for making an electrical connection to the high voltage winding assembly 16.

As illustrated in FIG. 7D, the end of the supply roll is now connected to the end 106 of portion 116 of the start-start connection 112, such as with a crimp type connector 132, and the second coil section 32 is wound, in a circumferential direction which is opposite to that of the first coil section 30. After the required number of turns have been achieved in part coil 32, the foil is severed to provide an outer end 134. Instead of folding the foil from the supply roll to form a "Z" shaped connector, it may also be prepared with a single fold, such as fold 104, such that the end of the foil coincides with the bottom edge of coil back up plate 44. The end of the supply roll of which part coil 32 is wound may then be connected to this "L" shaped interconnection with a crimp type connector. This embodiment of the invention is illustrated in FIG. 10, which shows an "L" shaped interconnection 112′ formed with a single fold 104′. The connection of the foil used to start part coil 32 is illustrated in phantom, using a crimp type connector 132′.

The next steps are to wind part coils 34 and 36, and they may be wound in a manner similar to part coils 30 and 32. As shown in FIG. 7F, a start-start connection 140 is provided, having spaced parallel folds 139 and 141, similar to the start-start connection 112 shown in FIG. 7B, with start-start connection 140 being fixed to coil back plate member 46. The third coil section 34 is then wound in the same circumferential direction as part coil 30. After completing the outer turn of part coil 34, as illustrated in FIG. 7G, the outer end of the foil may be folded twice on spaced parallel fold lines 149 and 151, to form Z shaped finish-finish connection 153, the extreme end of which is connected to the end 134 of part coil 32 with a crimp type connector 142. Alternatively, the outer turn of part coil 34 may be severed in a conventional manner, with the outer turn of part coil 32 being constructed to provide enough material to allow it to be folded twice into a Z shaped finish-finish connection, in which event the pressure type connector 142 would be aligned with part coil 34. Or, a preformed "Z" shaped piece may be used, which is connected to the ends of both coils with crimp type connectors. The next step is to connect the end of the supply roll to the free end 155 of the start-start connection 140, such as with a crimp type connector 144, and wind part coil 36 as shown in FIG. 7H. The end 146 of the outer turn of coil 36 may then be connected to a crimp type terminal 148 as shown in FIG. 7I, which has a wire 60 attached thereto having a length sufficient to extend above the surface of the cast solid insulation, to provide the other external connection to the high voltage winding assembly 16. FIG. 9 is a perspective view of the high voltage winding assembly 16 as completed in FIG. 7I, which more clearly illustrates the construction of the winding assembly with its two spaced support structures 40 and 40'.

Two of the crimp type terminals required in the method illustrated in FIGS. 7A through 7I may be eliminated if the foil is obtained in two connected rolls. The method of constructing the part coils according to this embodiment of the invention is illustrated in FIGS. 8A through 8C. FIG. 8A illustrates the forming of a start-start connection 160, similar to the start-start connection 112 shown in FIG. 7B, except that it is formed with the portion of the foil which interconnects the two supply rolls. The second supply roll may be secured to the winding mandrel and the first coil section 30 wound from the first supply roll to provide the first coil section 30, as shown in FIG. 8B. The winding direction of the mandrel may be then reversed and the second coil section 32 wound from the second supply roll, to provide coil section 32 as shown in FIG. 8C. Coil sections 34 and 36 may then be formed in a similar manner, with the outer end of coil section 32 or coil section 34, being folded twice as illustrated in FIG. 7G, to form the finish-finish connection between the part coils 32 and 34.

In summary, there has been disclosed new and improved encapsulated inductive apparatus which facilitates the manufacturing of high voltage windings having a plurality of axially spaced part coils. The disclosed construction is arranged to stress the solid encapsulating resin primarily in puncture, with the creep paths between adjacent coils being long compared with the close axial spacing of the coils. The disclosed construction is not limited to two axially spaced part coils, but may be extended to any number of coil sections. Also disclosed are new and improved constructions for obtaining cooling ducts through the solid insulation. New and improved methods of winding the part coils, with start-start, finish-finish connections are also disclosed, which greatly facilitate the manufacturing of these types of winding assemblies, which reduces the manufacturing time and the cost of such assemblies.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. An electrical winding comprising:
   first and second insulating support members,
   means fixed to each of said first and second insulating support members which provide a plurality of spaced electrically conductive surfaces on each of said insulating support members.
   a plurality of electrical coils coaxially disposed in spaced, side-by-side relation, each of said electrical coils having a plurality of radially superposed turns, including an inner start turn and an outer finish turn, said plurality of electrical coils being formed of an electrically conductive strip material, each of said electrical coils being fixed to an electrically conductive surface associated with each of said first and second insulating support members.
   and means electrically interconnecting said plurality of electrical coils to provide a series path through said coils having first and second ends.

2. The electrical winding of claim 1 wherein the first and second ends of the series path are located at the end of an outer finish turn on two of the plurality of electrical coils.

3. The electrical winding of claim 1 wherein the means interconnecting the plurality of coils interconnects the inner start turns of alternate coil pairs and the outer finish turns of the remaining coil pairs.

4. The electrical winding of claims 3 wherein the coil pairs having their inner start turns interconnected are insulatingly fixed to a common electrically conductive surface on each of the first and second insulating support members.

5. The electrical winding of claim 3 wherein the interconnections between at least the coil pairs having their inner start turns interconnected each include the electrically conductive strip of one of the coils folded to direct the strip into the location of the other coil, and means connecting the folded portion to the strip of the other coil.

6. The elecrical winding of claim 5 wherein the strip is folded at two spaced points perpendicular to the sides of the strip, to continue the strip in the same circumferdirect the strip into the location of the other coil, and the axial location of said one coil into the axial location of the next adjacent coil.

7. The electrical winding of claim 5 wherein the strip is folded only once, to provide a substantially "L" shaped interconnection.

8. The electrical winding of claim 3 wherein the interconnections between coil pairs each include the electrically conductive strip material of one of the coils folded to direct the strip into the location of coil it is to be connected to, and means connecting the folded portion of the strip to said coil.

9. The electrical winding of claim 1 wherein the first and second insulating support members have a longitudinal opening therein for providing a cooling duct through the winding.

10. The electrical winding of claim 1 wherein the means fixed to each of said first and second insulating support members are a plurality of metallic coil back plate members having first and second opposed surfaces, with at least a portion of their second surfaces being fixed to an insulating support member, and with the electrical coils being fixed to their first surfaces.

11. The electrical winding of claim 10 wherein the second surfaces of the metallic coil back plate members have less area than their first surfaces.

12. The electrical winding of claim 10 wherein the dimension of the second surfaces of the metallic coil back plate members, in the direction of the axes of the spaced electrical coils, is substantially less than this same dimension of the first surfaces of the metallic coil back plate members.

13. The electrical winding of claim 1 wherein the electrical coils are successively wound in opposite circumferential directions, and the coils are interconnected such that the series circuit, starting at one end thereof, traverses the turns of each of the electrical coils in the same circumferential direction.

14. The electrical winding of claim 1 including first and second duct former means, said duct former means being in removable engagement with said first and second insulating support members, respectively.

15. The electrical winding of claim 1 including terminal means connected to the ends of the outer finish turns of the coils located at each end of the coaxially disposed, spaced plurality of coils.

16. An electrical winding comprising:
    first and second insulating support members each having first and second major opposed surfaces, said first and second insulating support members being disposed in spaced relation with their second major surfaces facing one another,
    a plurality of metallic coil support members having first and second opposed surfaces, at least a portion of the second surfaces of said coil support members being fixed in like spaced locations across the first major surfaces of each of said first and second insulating support members,
    a plurality of electrical coils formed of the electrically conductive strip material wound to provide a plurality of insulated, radially superposed single turn layers, said electrical coils being coaxially disposed in spaced relation, supported by the first surfaces of said metallic coil suport members on said first and second insulating support members,
    and means connecting said plurality of electrical coils to provide a series circuit having first and second ends, with the series circuit starting at one of the ends and traversing the turns of each of said electrical coils in the same circumferential direction.

17. The electrical winding of claim 16 wherein the dimension of the second surfaces of the metallic coil support members, in the direction of the axes of the spaced electrical coils, is substantially less than this same dimension of the first surfaces of the metallic coil support members.

18. The electrical winding of claim 16 wherein alternate coil pairs are interconnected with start-start connections, and the remaining coil pairs are interconnected with finish-finish connections.

19. The electrical winding of claim 18 wherein the coil pairs interconnected with start-start connections are fixed to a common metallic coil support member on each of the first and second insulating support members.

20. The electrical winding of claim 18 wherein at least the start-start connections include the electrically conductive strip material of one of the coils folded to direct the strip into the location of the coil it is to be connected to, and means connecting the folded portion of the strip to the strip of the other coil.

21. The electrical winding of claim 20 wherein the strip is folded at two spaced points to continue the strip in the same circumferential direction, but offset from the axial location of said one coil into the axial location of the next adjacent coil.

22. The electrical winding of claim 20 wherein the strip is folded only once, to provide a substantially "L" shaped interconnection.

23. The electrical winding of claim 18 wherein the start-start and finish-finish connections each include the electrically conductive strip material of one of the coils folded at two spaced points, to continue the strip in the same circumferential direction, but offset from the axial location of said one coil into the axial location of the next adjacent coil.

24. Encapsulated electrical inductive apparatus comprising:
    at least first and second electrical windings disposed in concentric adjacent relation,
    cast solid insulating means disposed to surround and separate said first and second electrical windings,
    said first winding including first and second spaced insulating support members, at least two electrically conductive coil support members fixed in spaced relation to each of said first and second spaced insulating support members, and a plurality of axially spaced coil sections, each having a plurality of radially superposed turns formed of electrically conductive strip material, each of said plurality of electrical coils encircling said spaced insulating support members and being fixed to a metallic coil support member thereon, and means electrically interconnecting said plurality of electrical coils to provide a series path through the coils having first and second ends.

25. The encapsulated electrical inductive apparatus of claim 24 wherein the first and second spaced insulating support members and cast solid insulation cooperate to define the walls of cooling ducts disposed through the encapsulated apparatus.

26. The encapsulated electrical inductive apparatus of claim 24 wherein the first and second spaced insulating support members each have first and second ends, and an opening extending between their ends, with the first and second spaced insulating support members being disposed in the encapsulated apparatus such that their open ends are accessible.

27. The encapsulated electrical inductive apparatus of claim 24 wherein two coil sections are fixed to a common electrically conductive coil support member on each of the first and second insulating support members.

28. The encapsulated electrical inductive apparatus of claim 24 wherein the coil sections are interconnected with alternate start-start, finish-finish connections, with at least the start-start connections including the strip of one of the coils folded to direct the strip into the location of the other coil, and means connecting the folded portion to the strip of the other coil.

29. The encapsulated winding of claim 28 wherein the strip is folded at two spaced points, to continue the strip in the same circumferential direction but offset from the axial location of its associated coil into the axial location of the next adjacent coil.

30. The encapsulated winding of claim 28 wherein the strip is folded only once, to provide a substantially L-shaped interconnection.

31. The encapsulated electrical inductive apparatus of claim 28 wherein the finish-finish connections also include the strip of one of the coils folded at two spaced points to continue the strip in the same circumferential direction, but offset from the axial location of its associated coil into the axial location of the next adjacent coil.

References Cited

UNITED STATES PATENTS

| | | | |
|---|---|---|---|
| 734,778 | 7/1903 | Varley | 336—185 |
| 1,160,357 | 11/1915 | Agnew | 336—223X |
| 2,710,947 | 6/1955 | Gaston | 336—60 |
| 3,188,591 | 6/1965 | Dortont et al. | 336—185 |
| 3,195,084 | 7/1965 | Book | 336—60 |
| 3,464,043 | 8/1969 | Benko et al. | 336—223X |
| 3,467,931 | 9/1969 | Dutton | 336—232X |

THOMAS J. KOZMA, Primary Examiner

U.S. Cl. X.R.

336—84, 96, 185, 223